US012768610B2

(12) United States Patent
Allison et al.

(10) Patent No.: US 12,768,610 B2
(45) Date of Patent: Oct. 20, 2026

(54) SYSTEM AND METHOD FOR SAFETY SIGNALING USING OPTICAL FIBERS

(71) Applicants: David Benjamin Allison, Owens Cross Roads, AL (US); Anthony Edward Megna, Huntsville, AL (US)

(72) Inventors: David Benjamin Allison, Owens Cross Roads, AL (US); Anthony Edward Megna, Huntsville, AL (US)

(73) Assignee: KORD TECHNOLOGIES, LLC, Huntsville, AL (US)

( * ) Notice: Subject to any disclaimer, the term of this patent is extended or adjusted under 35 U.S.C. 154(b) by 211 days.

(21) Appl. No.: 18/638,232

(22) Filed: Apr. 17, 2024

(65) Prior Publication Data

US 2024/0353193 A1 Oct. 24, 2024

Related U.S. Application Data

(60) Provisional application No. 63/497,085, filed on Apr. 19, 2023.

(51) Int. Cl.

*F41A 17/06* (2006.01)
*G08B 7/06* (2006.01)
*H04B 10/25* (2013.01)

(52) U.S. Cl.

CPC ................ *F41A 17/06* (2013.01); *G08B 7/06* (2013.01); *H04B 10/25* (2013.01)

(58) Field of Classification Search

CPC .......... F41A 19/58; F41A 17/06; F41A 17/08; H04B 10/25; H04B 10/079; F42C 15/00; F42C 19/0815

See application file for complete search history.

(56) References Cited

U.S. PATENT DOCUMENTS 4,870,902 A * 10/1989 Simon ..................... F42B 3/113 102/218
5,138,946 A 8/1992 Soltz et al.
(Continued)

FOREIGN PATENT DOCUMENTS

WO WO-2024220529 A1 * 10/2024 ............. F41A 17/06

OTHER PUBLICATIONS

International Searching Authority, Patent Cooperation Treaty, International Search Report and Written Opinion for International Application No. PCT/US2024/024976 filed Apr. 17, 2024, 14 pages.

*Primary Examiner* — Benjamin P Lee
(74) *Attorney, Agent, or Firm* — Gary M. Machetta

(57) ABSTRACT

A safety signaling system comprises a panel including an HMI for setting first operator safety condition to one of VOTE and NO VOTE, a first optical transceiver for connection to a first optical fiber and a second optical transceiver for connection to a second optical fiber. Panel control circuitry connected between HMI and first transceiver activates first transceiver to transmit continuous wave (CW) light signal into first optical fiber only while HMI sets first operator safety condition to VOTE. A remote interface includes a third optical transceiver for connection to first optical fiber, a fourth optical transceiver for connection to second optical fiber, and remote interface control circuitry connected to third transceiver. The interface control circuitry sets a first received safety condition to VOTE only while CW light signal is received by third transceiver and uses the first received safety condition to determine a current first remote safety condition.

10 Claims, 6 Drawing Sheets

(56) References Cited

U.S. PATENT DOCUMENTS

| | | | | |
|---|---|---|---|---|
| 5,206,455 | A * | 4/1993 | Williams | F42C 21/00 102/201 |
| 5,404,820 | A | 4/1995 | Hendrix | |
| 6,374,739 | B1 * | 4/2002 | Smith | F42C 11/00 102/221 |
| 6,718,881 | B2 * | 4/2004 | Rauscher, Jr. | F42C 19/06 102/218 |
| 6,732,656 | B1 | 5/2004 | Heyse et al. | |
| 2003/0159609 | A1 * | 8/2003 | Rauscher, Jr. | F42C 19/06 102/217 |
| 2024/0118059 | A1 * | 4/2024 | Allison | F41H 13/0062 |

* cited by examiner

SYSTEM AND METHOD FOR SAFETY SIGNALING USING OPTICAL FIBERS

CROSS REFERENCE TO RELATED APPLICATION

This application claims priority to U.S. Provisional patent application having Ser. No. 63/497,085 filed on Apr. 19, 2023 which is incorporated by reference herein.

TECHNICAL FIELD

The following disclosure relates to a safety protocol over fiber optics that is capable of providing the critical arm and abort signals at up to 20 km or further with no latency and perfect determinism (i.e., no firmware or software in the loop). This is critical for any remote weapon system. In one embodiment, the safety signaling system is suitable for signaling a high energy laser weapon system (HELWS).

BACKGROUND

Safety signaling systems are typically used to limit the functionality of weapon systems whose operation may be hazardous to nearby personnel or dangerous to potential targets. Such weapon systems can include missiles, rockets, gun systems and antiaircraft systems. In many cases the user in charge of the safety signaling system is located remotely from the weapon system. Due to the hazardous nature of weapons systems, it is of utmost importance that the safety signaling system operates with the highest possible speed and reliability so that, when necessary, operation of the weapon system can be suspended with great assurance and minimum delay. Conventional safety signaling systems relying on electrical connections can have their effective range limited by signal degradation due to, e.g., resistive voltage losses, cross interference with nearby electrical lines and or radio frequency interference (RFI) and/or electromagnetic interference (EMI). A need therefor exists, for a safety signaling system that allows remote signaling to weapon systems at longer ranges with great assurance and minimum delay.

SUMMARY

In one aspect, a safety signaling system comprises a first voltage to light converter (VTLC) disposed at an operator panel, the first VTLC configured to output a first light signal of a first predetermined light frequency only when receiving a predetermined first voltage indicative of a first operator safety condition set to a first value. A first optical fiber is operatively connected at a first end to the first VTLC to receive the first light signal outputted by the first VTLC and to propagate the first light signal to a second end. A first light to voltage converter (LTVC) is disposed at a remote interface, the first LTVC operatively connected to the second end of the first optical fiber to receive the first light signal, the first LTVC configured to output a predetermined second voltage only when receiving the first light signal. Remote interface control circuitry is disposed at the remote interface, the remote interface control circuitry operatively connected to the first LTVC to receive the predetermined second voltage when outputted by the first LTVC and configured to set a first received safety condition to a first value when receiving the predetermined second voltage. The first light signal provides a first forward channel. The first received safety condition set to the first value at the remote interface control circuitry is determinative that the first operator safety condition is currently set to the first value. The remote interface control circuitry uses the first received safety condition to determine a current value of a first remote safety condition.

In one embodiment, the current value of the first remote safety condition is transmitted by the remote interface control circuitry to a remote system.

In another embodiment, the first light signal is a continuous wave (CW) signal.

In still another embodiment, no software, no computers and no encoding are used to transmit the first voltage, the first light signal and the second voltage between the safety operator panel and the remote interface.

In yet another embodiment, the remote interface control circuitry sets the current value of the first remote safety condition to the current value of the first received safety condition.

In a further embodiment, the remote interface control circuitry further comprises a failure latch subcircuit operatively attached to the first LTVC to monitor the second voltage. The failure latch subcircuit is configured to output a fault value to the remote interface control circuitry upon detecting an interruption of the predetermined second voltage. The remote interface control circuitry is further configured to set the current value of the first remote safety condition to a second value upon receiving the fault value from the failure latch subcircuit, regardless of the current value of the first received safety condition. The remote interface control circuitry is further configured to hold the current value of the first remote safety condition at the second value until the failure-latch subcircuit is reset.

In a still further embodiment, the safety signaling system further comprises a second VTLC disposed at the remote interface, the second VTLC configured to output a second light signal of a predetermined second light frequency, the second light frequency being different from the first light frequency, the second light signal transmitting a quality of service (QOS) attribute of the first forward channel. The first optical fiber is operatively connected at the second end to the second VTLC to receive the second light signal outputted by the second VTLC and to propagate the second light signal to the first end. A second LTVC is disposed at the safety operator panel, the second LTVC operatively connected to the first end of the first optical fiber to receive the second light signal, the second LTVC configured to output a QOS voltage indicative of the QOS attribute of the first forward channel. The second light signal provides a first backhaul channel.

In a yet further embodiment, the first VTLC and the second LTVC are provided by a first bidirectional modular transceiver disposed at the operator panel. The second VTLC and the first LTVC are provided by a second bidirectional modular transceiver disposed at the remote interface.

In another embodiment, the SSOF system further comprises a third VTLC disposed at the operator panel, the third VTLC configured to output a third light signal of a predetermined third light frequency indicative of a network message. A second optical fiber is operatively connected at a first end to the third VTLC to receive the third light signal outputted by the third VTLC and to propagate the third light signal to a second end. A third LTVC is disposed at the remote interface, the third LTVC operatively connected to the second end of the second optical fiber to receive the third light signal, the third LTVC configured to output a third voltage indicative of the network message when receiving the third first light signal. A fourth VTLC is disposed at the remote interface, the fourth VTLC configured to outputted a fourth light signal of a predetermined fourth light frequency, the fourth light frequency being different from the third light frequency, the fourth light signal transmitting another network message. The second optical fiber is operatively connected at the second end to the fourth VTLC to receive the fourth light signal output by the fourth VTLC and to propagate the fourth light signal to the first end. A fourth LTVC is disposed at the safety operator panel, the fourth LTVC is operatively connected to the first end of the second optical fiber to receive the fourth light signal, and the fourth LTVC is configured to output another network voltage indicative of the another network message. The third and fourth light signals together provide a bidirectional pair of network communication channels.

In still another embodiment, the third VTLC and the third LTVC are provided by a third bidirectional modular transceiver disposed at the operator panel, and the fourth VTLC and the fourth LTVC are provided by a fourth bidirectional modular transceiver disposed at the remote interface.

In another aspect, a safety signaling system comprises an operator panel including a human machine interface (HMI) for setting the value of a first operator safety condition to one of status=VOTE and status=NO VOTE, a first bidirectional optical transceiver configured for connection to a first optical fiber, a second bidirectional optical transceiver configured for connection to a second optical fiber, and operator panel control circuitry operatively connected between the HMI and the first bidirectional optical transceiver. The panel control circuitry activates the first bidirectional optical transceiver to transmit a continuous wave (CW) light signal into a connected first optical fiber only while the HMI sets the value of the first operator safety condition to status=VOTE. A remote interface includes a third bidirectional optical transceiver configured for connection to the first optical fiber, a fourth bidirectional optical transceiver configured for connection to the second optical fiber, and remote interface control circuitry operatively connected to the third bidirectional optical transceiver. The interface control circuitry sets a value of a first received safety condition to status=VOTE only while the CW light signal is received by the third bidirectional optical transceiver. The remote interface control circuitry uses the value of the first received safety condition to determine a current value of a first remote safety condition.

In one embodiment, the system further comprises first network interface circuitry disposed at the safety operator panel and operatively connected to the third bidirectional optical transceiver. Second network interface circuitry is disposed at the remote interface and operatively connected to the fourth bidirectional optical transceiver. The third and fourth bidirectional transceivers are configured to transmit network messages to one another through a connected second optical fiber and to relay the network messages to and from external sources.

In another embodiment, the remote interface control circuitry further comprises a latch subcircuit operatively attached to the second bidirectional optical transceiver to monitor the received CW light signal. The latch subcircuit is configured to output a fault value to the remote interface control circuitry upon detecting an interruption of the received CW light signal. The remote interface control circuitry is further configured to set the current value of the first remote safety condition to status=NO VOTE upon receiving the fault value from the latch subcircuit, regardless of the current value of the first received safety condition. The remote interface control circuitry is further configured to hold the current value of the first remote safety condition at status=NO VOTE until the latch subcircuit is reset.

BRIEF DESCRIPTION OF THE DRAWINGS

For a more complete understanding, reference is now made to the following description taken in conjunction with the accompanying Drawings in which.

DETAILED DESCRIPTION

Figure 1:
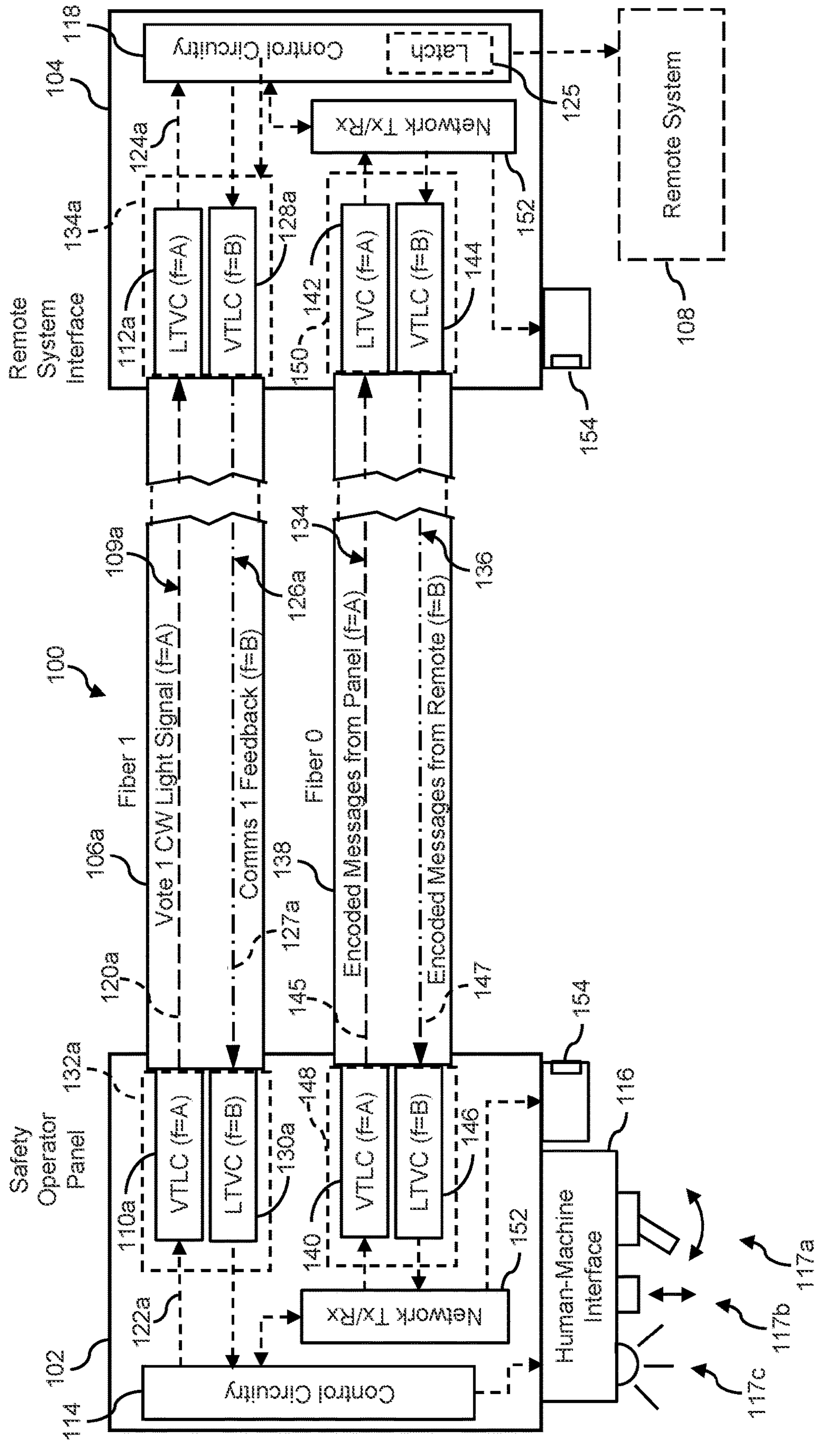
FIG. 1 shows a block diagram of a single channel safety signaling system in accordance with one aspect.

Referring to FIG. 1, there is illustrated a block diagram of a single channel system for safety signaling using optical fibers ("SSOF system") 100. The SSOF system 100 comprises a safety operator panel 102 and a remote system interface 104 connected by one or more optical fibers 106. The remote system interface 104 can be disposed on, or local to, any remote system 108 to be signaled by the SSOF system 100. The safety operator panel 102 can be disposed remotely from the remote system 108 at a location where it is desired to initiate safety signaling to the remote system. The SSOF system 100 is preferably used only for safety signaling the remote system 108, i.e., the remote system will typically have its own control system separate from the SSOF system.

The safety operator panel 102 of the SSOF system 100 can be disposed at any optically accessible distance from the remote system interface 104. As used herein, the term "optically accessible" means a distance over which the optical fiber 106 exhibits no material signal loss between the safety operator panel 102 and the remote interface 104. As used herein, signal loss is considered "material" to the SSOF system 100 when it changes the reliability of the remote interface 104 in correctly receiving the intended signal sent from the operator safety panel 102. In many cases, the safety operator panel 102 can be disposed at a distance from the remote system interface 104 that is optically accessible and also electrically remote. As used herein, the term "electrically remote" means a distance at which an electrical connection, e.g., copper wire, if present between the safety operator panel 102 and the remote interface 104, would exhibit material signal loss from one of length-related resistance, cross interference, RFI or EFI.

In preferred embodiments, each optical fiber 106 will be a single continuous fiber end-to-end without any inline optical amplifiers or repeaters between the safety operator panel 102 and the remote interface 104. The use of inline optical amplifiers or repeaters on optical fibers 106 is avoided when possible because such devices introduce signal delay, impose power requirements, and reduce the inherent reliability of the SSOF system 100. In some embodiments, each fiber 106 is a single continuous fiber having a length of at least 10 km end-to-end without any inline optical amplifiers or repeaters between the ends of the fiber. In other embodiments, each fiber 106 is a single continuous fiber having a length of at least 20 km end-to-end without any inline optical amplifiers or repeaters between the ends of the fiber. In still other embodiments, each fiber 106 is a single continuous fiber having a length of at least 30 km end-to-end without any inline optical amplifiers or repeaters between the ends of the fiber.

The remote interface 104 can be mounted directly on the remote system 108 or within an electrically local distance of the remote system. As used herein, the term "electrically local" means a distance within which electrical connections between the remote interface 104 and the remote system 108 do not exhibit material signal loss from length-related electrical resistance, nor from cross interference, RFI and EFI.

The SSOF system 100 includes one or more forward channels 109, each respective forward channel comprising a respective first voltage to light converter (VTLC) 110 disposed at the safety operator panel 102, a respective first light to voltage converter (LTVC) 112 disposed at the remote interface 104 and a respective optical fiber 106 operably connected therebetween (denoted "Fiber 1" in FIG. 1). Each first VTLC 110 is operably connected to operator control circuitry 114 at the operator safety panel 102, which in turn is operatively connected to an operator human-machine interface (HMI) 116 at the operator safety panel. The HMI 116 may include, but is not limited to, switches 117*a* and buttons 117*b* that can be operated by the user at the safety operator panel 102 to indicate safety considerations and indicator lights 117*c* that can be observed by the user to indicate the status of the respective channels or the overall SSOF system 100. In preferred embodiments, no software, no computers and no encoding are used to transmit signals between the operator HMI 116 and the operator control circuitry 114. Each first LTVC 112 is operatively connected to remote interface circuitry 118 at the remote interface 104, which in turn may be connected to a remote HMI (not shown) and/or connected directly to the remote system 108. In preferred embodiments, no software, no computers and no encoding are used to transmit signals between the remote interface circuitry 118 and the remote HMI (if present) and/or the remote system 108.

For each respective forward channel 109, the respective first VTLC 110 is configured to output a respective first light signal 120 when receiving a respective predetermined first voltage 122 from the operator control circuitry 114, and to not produce the first light signal when the predetermined first voltage is not received. In preferred embodiments, no software, no computers and no encoding are used in the operator control circuitry 114 to produce the predetermined first voltage 122. For each respective forward channel 109, the respective first light signal 120 is propagated into the operator end of the respective optical fiber 106, travels through the optical fiber, and is received by the respective first LTVC 112 from the remote end of the optical fiber. In preferred embodiments, each respective optical fiber 106 is a single continuous fiber end-to-end without any inline optical amplifiers or repeaters between the operator end and the remote end. Each respective first LTVC 112 is configured to output a respective predetermined second voltage 124 to the remote interface circuitry 118 when receiving the respective first light signal 120 from the remote end of the respective optical fiber 106, and to not produce the predetermined second voltage when not receiving the first light signal.

The status of various safety considerations determined by the safety operator at the operator panel 102 can be termed as one or more operator safety conditions. A safety signaling system, e.g., SSOF system 100, can use one forward channel 109 to signal each such operator safety condition to the remote interface 104. Many such operator safety conditions have a binary character, and thus each condition can have a pair of possible values such as "VOTE" and "NO VOTE", "1" and "0", "GO" and "NO GO", etc. Thus, the state of receiving a respective predetermined second voltage 124 on a respective forward channel 109 at the remote interface 104 can be termed a "VOTE" on the respective forward channel, and the state of not receiving the predetermined second voltage 124 at the remote interface can be termed a "NO VOTE". Thus, each respective forward channel 109 from the operator control circuitry 114 to the remote interface circuitry 118 is considered deterministic because VOTE status on the respective forward channel at the remote interface 104 can only be the result of the having the respective predetermined first voltage 122 on the respective forward channel at the operator panel 102. In other words, the appearance of a VOTE status for a respective channel at the remote interface 104 is conclusive that a VOTE status currently exists for the respective channel at the safety operator panel 102 and that the respective channel is operating properly. Any interruption of the of the respective first voltage 122, or failure of the respective first VTLC 110, break in the respective optical fiber 106, or failure of the respective first LTVC 112 would result in NO VOTE status at the remote interface 104 on the respective forward channel 109.

In some embodiments, the HMI 116 at the safety operator panel 102 can be configured for selective movement between a VOTE position and a NO VOTE position for each respective forward channel 109. In turn, the operator control circuitry 114 can be configured to output the predetermined respective first voltage 122 only when the HMI 116 is in the VOTE position for the respective forward channel 109. Thus, when the operator moves the HMI 116 to set VOTE status for a selected forward channel 109, the SSOF system 100 will instantly (i.e., at the speed of light through fiber) reflect VOTE status for the selected forward channel at the remote interface 104. When the operator moves the HMI 116 into NO VOTE position for the first forward channel 109, or if there is any failure along the selected forward channel, the SSOF system 100 will instantly (i.e., at the speed of light through fiber) reflect NO VOTE status for the selected forward channel at the remote interface 104.

In a preferred embodiment, the SSOF system 100 utilizes a continuous wave (CW) light having a first predetermined frequency for the first light signal 120. CW light has advantages for use in the forward channels of the SSOF system 100 over other signal forms (e.g., modulated or pulsed signals) due to its continuous nature, e.g., interruption of CW light for any period of time is detectable. In contrast, a brief interruption of a modulated or pulsed light signal, e.g., an interruption occurring between expected peaks or pulses, may not be immediately detected (especially if the interruption is temporary or intermittent). In some embodiments, the remote interface circuitry 118 can further include a failure latch subcircuit 125 for one or more forward channels 109 configured such that, upon detection of an interruption in either the first light signal 120 or the second voltage 124 for the respective forward channel, the failure latch subcircuit will set the remote interface circuitry to NO VOTE status for that forward channel, wherein the status will remain in NO VOTE status for that forward channel until the system is reset by the operator, even if the first light signal or the second voltage is resumed.

For example, FIG. 1 illustrates a SSOF system 100 having a single forward channel 109*a*. The forward channel 109*a* comprises a first optical fiber 106*a* (denoted "Fiber 1" in FIG. 1) operably connected between a first VTLC 110*a* and a first LTVC 112*a*. The first VTLC 110*a* is operably connected to the operator control circuitry 114 at the operator safety panel 102, which in turn is operatively connected to the operator HMI 116 at the operator safety panel. The first LTVC 112*a* is operatively connected to remote interface circuitry 118 at the remote interface 104, which in turn is connected to a remote HMI (not shown) and/or connected directly to the remote system 108. The first VTLC 110*a* is configured to output a first light signal 120*a* having a predetermined first light frequency/wavelength (e.g., frequency "A") when receiving a predetermined first voltage 122*a* from the operator control circuitry 114, and to not produce the first light signal when the first voltage is not received. The respective first light signal 120*a* is propagated into the operator end of the optical fiber 106*a*, travels through the optical fiber, and is received by the first LTVC 112*a* from the remote end of the optical fiber. The state of receiving the predetermined second voltage 124*a* on the forward channel 109*a* at the remote interface 104 is termed a "VOTE" on the forward channel 109*a*, and the state of not receiving the second voltage at the remote interface is termed a "NO VOTE" on the forward channel. The forward channel 109*a* is considered deterministic from the operator control circuitry 114 to the remote interface circuitry 118 because VOTE status on the forward channel at the remote interface 104 can only be the result of the having the predetermined first voltage 122*a* on the forward channel at the operator panel 102 and the forward channel being intact and working properly.

Referring still to FIG. 1, in some embodiments, the SSOF system 100 can further comprise one or more "comms feedback" or "backhaul" channels 126 utilizing the same optical fiber 106 as one of the forward channels but with a second light signal 127 having a second predetermined light frequency/wavelength (e.g., frequency "B") that is different from the first predetermined frequency/wavelength of the forward channel on that optical fiber. Such backhaul channels 126 can be used to provide direct feedback regarding the signal integrity of the associated forward channel 109 and/or of the physical integrity of the optical fiber 106 used by the forward channel (collectively, "quality of service" or "QOS"). Each respective backhaul channel 126 can comprise a respective second VTLC 128 disposed at the remote interface 104, a respective second LTVC 130*a* disposed at the safety operator panel 102, and the respective optical fiber 106 operably connected therebetween. In some embodiments, the VTLC and LTVC devices required to operate a respective forward channel 109 and a respective backhaul channel 126 on a single respective fiber 106 can be provided by a respective pair of bidirectional (BiDi) modular transceivers 132, 134, e.g., such as SFP transceivers. A first BiDi modular transceiver 132 disposed at the operator panel 102 can provide the first VTLC 110 and the second LTVC 130, and a second BiDi modular transceiver 134 disposed at the remote interface 104 can provide the second VTLC 128 and the first LTVC 112. The second light signal 127 of the backhaul channel 126 can be CW or modulated. In some embodiments, the QOS information for the backhaul channel 126 is provided by the remote interface circuitry 118, whereas in other embodiments, e.g., those using modular SFP transceivers 132, 134 the QOS information can be generated by the modular transceiver itself.

As previously discussed, the forward channels 109 require utmost assurance and minimum delay in providing safety signaling from the safety operator panel 102 to the remote interface 104. Accordingly, in preferred embodiments, the forward channels 109 use CW light signals, optical fibers 106 that are continuous from end-to-end without inline light amplifiers or repeaters, and/or do not utilize software, computers or encoding to provide the voltages 122, 124 and first light signals 120 between the safety operator panel 102 to the remote interface 104. In contrast, since the backhaul channels 126 are not providing the actual safety signaling, but instead are reporting QOS and/or other attributes of the forward channels 109, the backhaul channels may sometimes use modulated light signals and software or encoding along the backhaul channel.

Referring still to FIG. 1, in some embodiments, the SSOF system 100 can further comprise one or more network communication channels 134, 136 utilizing a second optical fiber 138 (denoted "Fiber 0" in FIG. 1) extending between the safety operator panel 102 and the remote interface 104. Such network communication channels 134, 136 are typically used for sending ordinary messages (i.e., not safety signaling) between the safety operator panel 102 and the remote interface 104. While some embodiments may utilize unidirectional communications on the network communication fiber 138, typical embodiments utilize bidirectional communication with two channels 134, 136 as illustrated in FIG. 1, allowing two-way network communication between the safety operator panel 102 and the remote interface 104.

The network communication channels typically utilize the second optical fiber 138 operably connected between a first network VTLC 140 at the safety operator panel 102 and a first network LTVC 142 disposed at the remote interface 104 providing the outbound channel 134, and a second network VTLC 144 disposed at the remote interface and a second network LTVC 146 disposed at the safety operator panel providing the inbound channel 136. The first network VTLC 140 is configured to output a first light signal 145 having a predetermined first light frequency/wavelength (e.g., frequency "A") to carry the outbound network messages to the first network LTVC 142. The second network VTLC 144 is configured to output a second light signal 147 having a predetermined second light frequency/wavelength (e.g., frequency "B") to carry the inbound network messages back to the second network LTVC 146. In some embodiments, the network VTLC and LTVC devices required to operate the outbound channel 134 and the inbound channel 136 on the single fiber 138 can be provided by a pair of BiDi modular transceivers. A first network BiDi modular transceiver 148 disposed at the operator panel 102 can provide the first network VTLC 140 and the second network LTVC 146, and a second network BiDi modular transceiver 150 disposed at the remote interface 104 can provide the second network VTLC 144 and the first network LTVC 142. In preferred embodiments, the networked communication channels 134, 136 utilize an encoded Ethernet protocol, e.g., TCP/IP, for transmission of bidirectional messages. A network transceiver 152 can be provided at each end of the network communication channels 134, 136 to handing the encoding, decode, routing, etc. of the network messages. The respective network transceivers 152 can be operatively connected to the operator control circuitry 114 at the safety operator panel 102, to the remote interface control circuitry 118 at the remote interface 104, and/or to external network ports 154 (e.g., ethernet jacks) disposed at the safety operator panel and the remote interface.

When the safety operator panel 102 and remote system interface 104 are connected by a fiber optic 106, the SSOF system 100 can operate to perform at least one channel of safety signaling as follows:

A) To signal a safety VOTE status from the safety operator panel 102, the predetermined first voltage 122 is inputted into the first VTLC 110, which causes the first VTLC to produce the first light signal 120 and propagate the first light signal into the operator end of the optical fiber 106. The predetermined first voltage 122 can be produced by setting the HMI 116 on the safety operator panel 102 to a setting corresponding to VOTE status.

B) The first light signal 120 is transmitted through the optical fiber 106 until it reaches the remote end, at which point the first light signal is received by the first LTVC 112, which causes the first LTVC to output the predetermined second voltage 124.

C) Receiving the predetermined second voltage 124 at the remote system interface 104 sets the remote safety status to VOTE and this status is passed to the remote system 108. This can be considered open-loop safety signaling of a VOTE signal from the safety operator panel 102 to the remote system interface 104. When the predetermined second voltage 124 is not received at the remote interface 104, the remote interface control circuitry 118 sets the remote safety status to NO VOTE and this status is passed to the remote system 108.

D) Optionally, the remote system interface 104 can be further configured to include a safety latch subcircuit 125. Interruption of the predetermined second voltage 124 at the remote system interface 104 causes activation of the safety latch subcircuit 125, wherein the safety latch subcircuit changes the safety status to NO VOTE (regardless of the subsequent second voltage 124) until the SSOF system is reset by the operator.

E) Optionally, the remote interface 104 can be further configured to confirm the remote safety status by sending a second light signal 127 from a second VTLC 128 at the remote interface to a second LTVC 130 at the operator panel 102, wherein the second light signal can indicate, at the safety operator panel, the current safety status of VOTE or NO VOTE at the remote interface.

Figure 2:
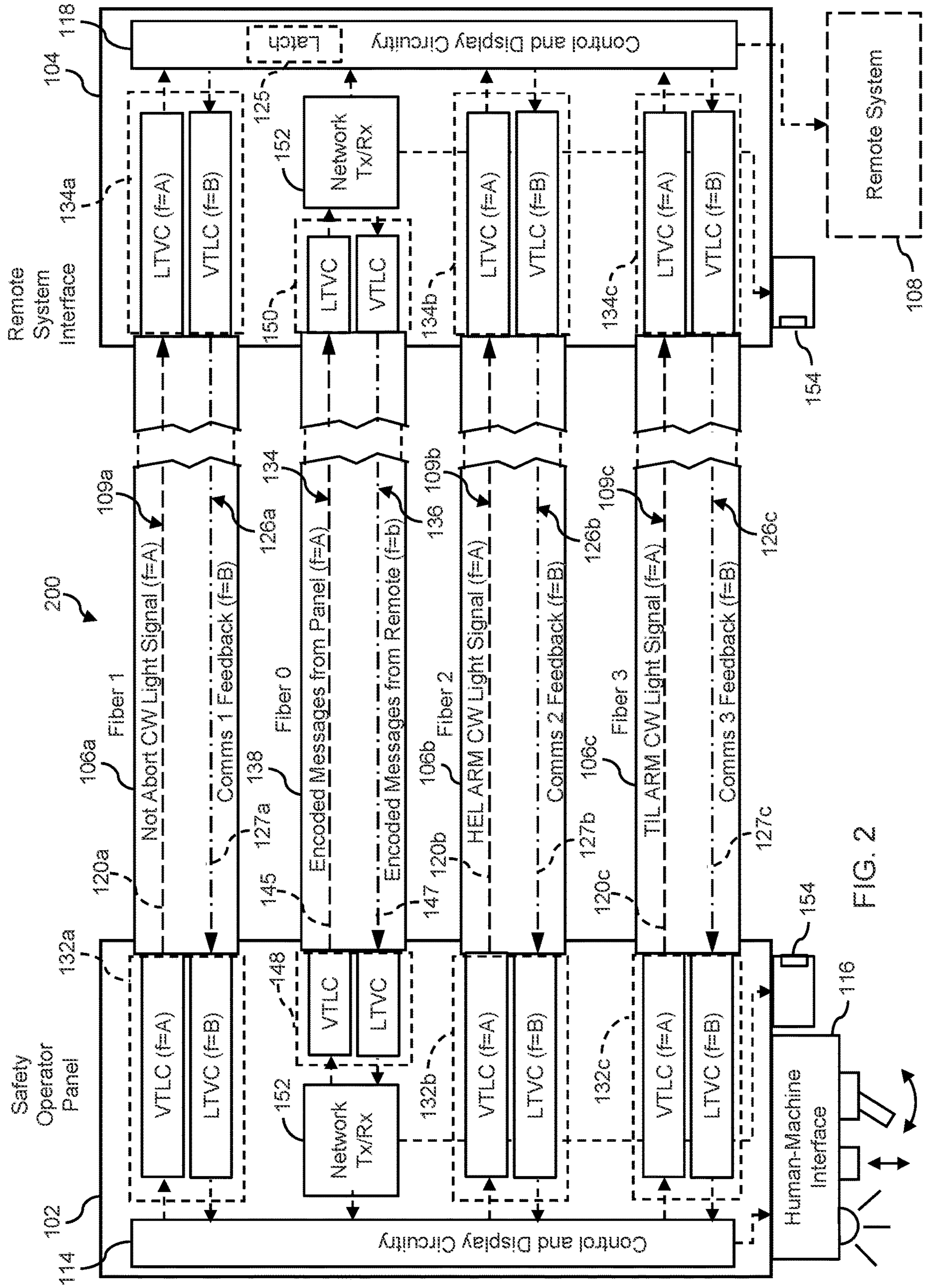
FIG. 2 shows a block diagram of a three channel safety signaling system in accordance with another aspect.

Referring now to FIG. 2, there is illustrated a multi-channel SSOF system 200 providing three forward safety channels, namely, 109*a*, 109*b* and 109*c*, and a bidirectional network communication channel 134, 136 between the safety operator panel 102 and the remote interface 104 in accordance with another embodiment. The multi-channel SSOF system 200 can be used for safety signaling of a weapons system, e.g., a high energy laser weapons system (HELWS), but the SSOF system is not limited to such use. In the illustrated embodiment, each forward channel 109 is transmitted through a separate optical fiber 106 using a separate light signal as follows: a first forward channel 109*a* is transmitted through the optical fiber 106*a* ("Fiber 1" in FIG. 2) on light signal 120*a* and is dedicated to carrying a value for a "NOT ABORT" input that must have either status=VOTE or status=NOT VOTE; a second forward channel 109*b* is transmitted through an optical fiber 106*b* ("Fiber 2" in FIG. 2) on a light signal 120*b* and is dedicated to carrying a value for a "HEL ARM" input that must have either status=VOTE or status=NOT VOTE; a third forward channel 109*c* is transmitted through an optical fiber 106*c* ("Fiber 3" in FIG. 2) on a light signal 120*c* and is dedicated to caring a value for a "TIL ARM" input that must have either status=VOTE or status=NOT VOTE. In the illustrated embodiment, each respective light signal 120*a*, 120*b* and 120*c* has the same predetermined first light frequency/wavelength (frequency "A"); however, in other embodiments the light signals 120*a*, 120*b* and 120*c* can have different light frequencies/wavelengths on different optical fibers. Although not required, in the illustrated embodiment, each respective optical fiber 109*a*, 109*b* and 109*c* also transmits a respective backhaul channel 126*a*, 126*b* and 126 using respective light signals 127*a*, 127*b* and 127*c*. The respective backhaul channels 127*a*, 127*b* and 127*c* can be used to transmit QOS or other information regarding the respective associated forward channels or other aspects of the system. In the illustrated embodiment, each respective second light signal 127*a*, 127*b* and 127*c* uses the same predetermined second light frequency/wavelength (frequency "B"); however, in other embodiments each second light signal could use a different light frequency/wavelength as long as the respective first and second light signals on the same optical fiber are at different light frequencies/wavelengths from one another.

Referring further to FIG. 2, each forward channel 109 of the SSOF system 200 uses a first VTLC and a first LTVC and each backhaul channel (if present) uses a second VTLC and a second LTVC as previously described in connection with Fiber 1 of FIG. 1. This configuration for each of Fiber 1, Fiber 2 and Fiber 3 is substantially similar to that described in connection with Fiber 1 in FIG. 1. In the illustrated embodiment of FIG. 2, each respective first VTLC and second LTVC are part of a first BiDi transceiver module 132 disposed at the safety operator panel 102 and each respective second VTLC and first LTVC are part of a second BiDi transceiver module 134 disposed at the remote interface 104. The details of each forward channel 109 and each backhaul channel 126 in SSOF system 200 are substantially similar to those described for forward channel 109*a* and backhaul channel 126*a* of "Fiber 1" of FIG. 1.

Referring still to FIG. 2, in the illustrated embodiment, the bidirectional network channels 134, 136 of SSOF system 200 are carried by the optical fiber 138 ("Fiber 0" in FIG. 2). One light signal 145 is used for the outgoing network channel 134 and a second light signal 147 is used for the incoming network channel 136. The VTLC and LTVC for the channels 134, 136 can be discrete or provided by BiDi transceiver modules 148, 150. The details of the bidirectional network channels 134, 136 of SSOF system 200 are substantially similar to the network channels 134, 136 described in connection with Fiber 0 of FIG. 1.

Referring now to FIGS. 3-6, there is illustrated one embodiment of a safety operator panel for a SSOF system in accordance with another aspect. The safety operator panel 302 is suitable for use with a multi-channel SSOF system such as SSOF system 200 providing three forward safety channels and a bidirectional network communication channel between the safety operator panel 302 and the remote interface 104. A different safety state can be associated with each forward channel of the SSOF system.

Figure 3:
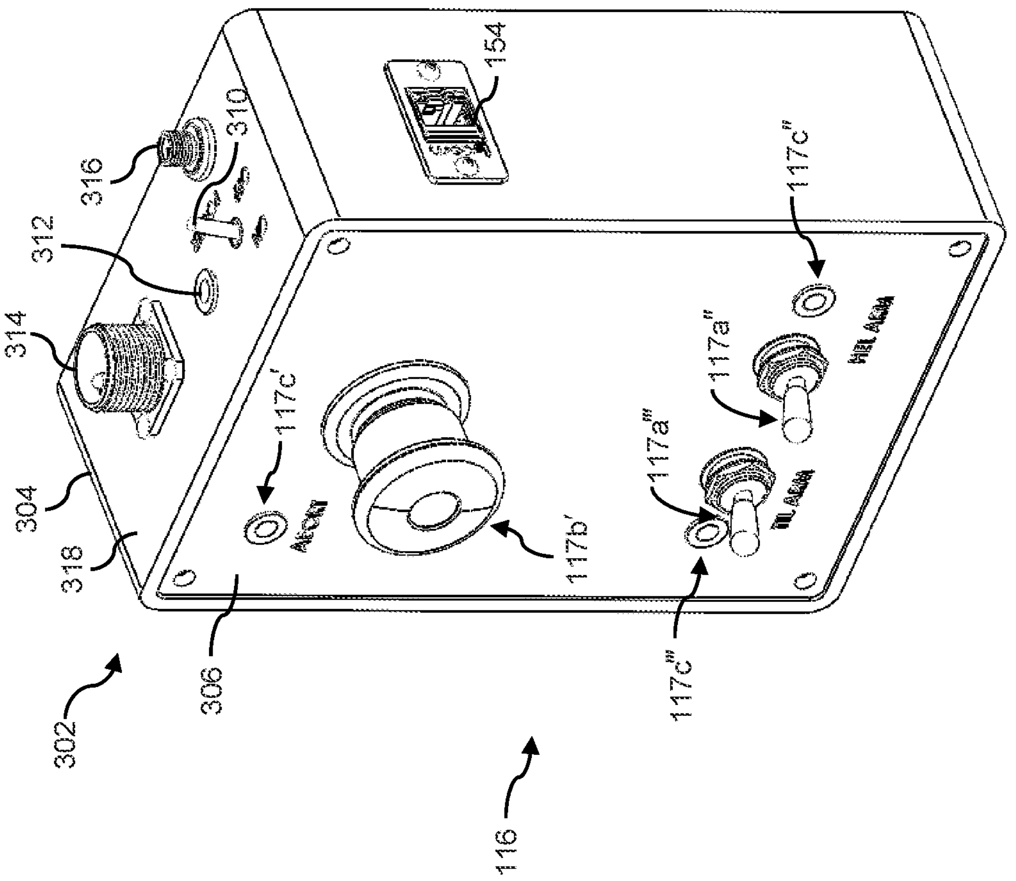
FIG. 3 shows a front right perspective view of an operator control panel for a three channel safety signaling system in accordance with a further aspect.

Referring first to FIG. 3, the panel 302 includes a rectangular case 304 having an HMI 116 on the front face 306. The illustrated panel 302 is suitable to set safety states for the following variables: NOT ABORT, HEL ARM and TIL ARM, each of which can be set to status=VOTE or status=NO VOTE. The HMI 116 includes a push button 117*b*' for setting the NOT ABORT variable, a first switch 117*a*" for setting the HEL ARM variable and a second switch 117*a*' for setting the TIL ARM variable. The panel 302 can further includes indicator lights to show the settings of the HMI buttons and switches. In the illustrated embodiment, light 117*c*' illuminates when switch 117*b*' is moved to set the NOT ABORT variable to status=VOTE and does not illuminate when the switch is set to status=NO VOTE. A light 117*c*" illuminates when the switch 117*a*" is moved to set the HEL ARM variable to status=VOTE and does not illuminate when the switch is set to status=NO VOTE. A light 117*c*' illuminates when the switch 117*a*" is moved to set the TIL ARM variable to status=VOTE and does not illuminate when the switch is set to status=NO VOTE. A network outlet jack 154 is provided on the right side 308 of the case 304. A power switch 310, power indicator light 312 and data ports 314 and 316 are provided on the top face 318 of the case 304.

Figure 4:
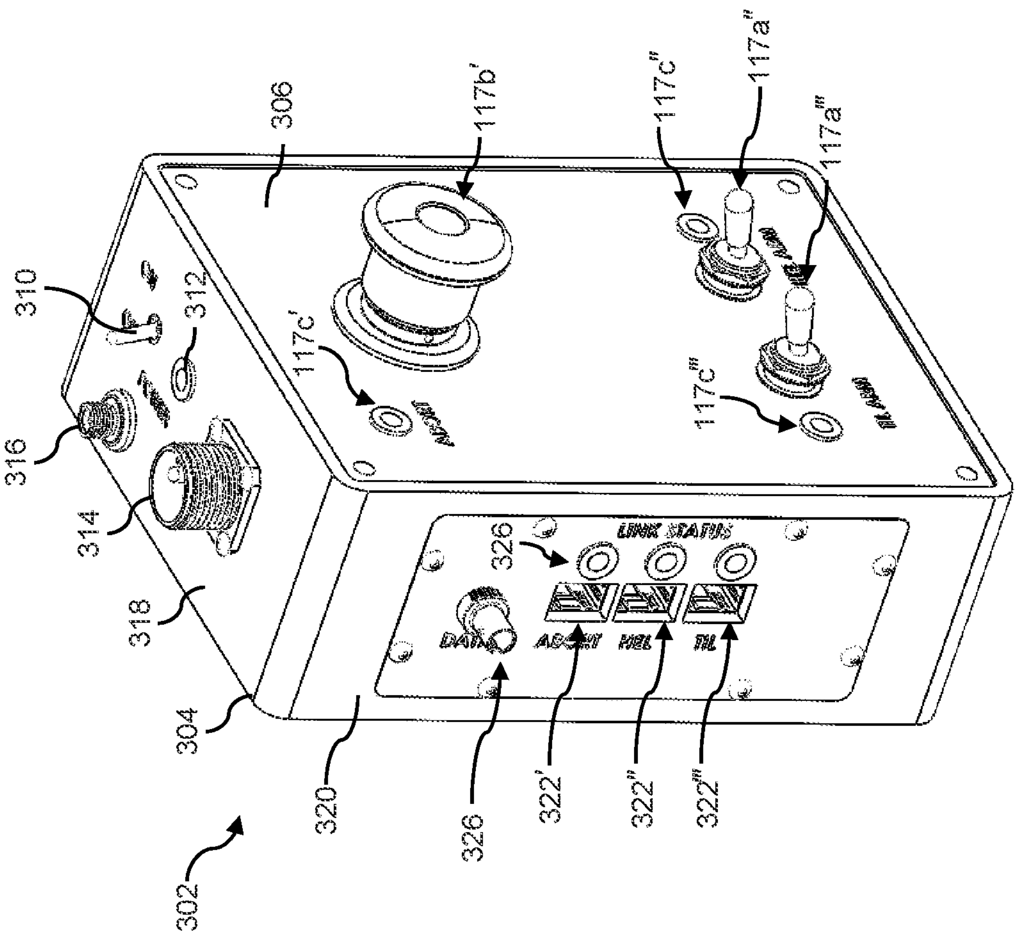
FIG. 4 shows a front left perspective view of the operator control panel of FIG. 3.

Referring now also to FIG. 4, the left face 320 of the case 304 is shown including optical fiber jacks 322', 322", and 322' for connecting optical fiber 120*a* (i.e., "Fiber 1"), 120*b* (i.e., "Fiber 2") and 120*c* (i.e., "Fiber 3"), respectively, to the bidirectional SFP transceivers disposed within the panel 302. Also shown is network fiber jack 326 for connecting network optical fiber 138 (i.e., "Fiber 0") to the network bidirectional SFP transceiver disposed within the panel 302. Adjacent to each optical fiber jack 322', 322", and 322'" is an associated QOS indicator light 324 that illuminates to indicate the QOS status of the optical fiber and its light signals.

Figure 5:
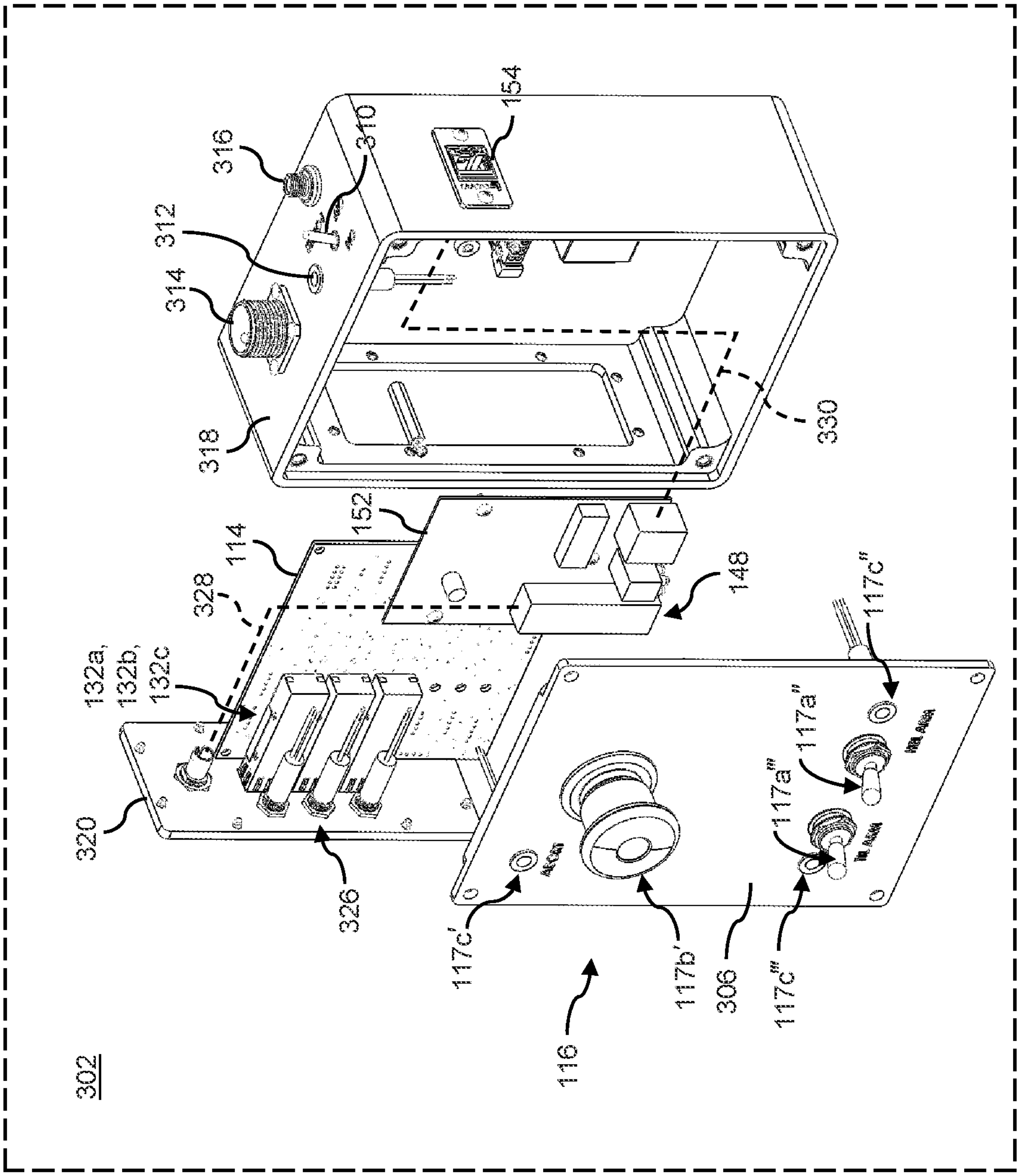
FIG. 5 shows a front right exploded view of the operator control panel.
Figure 6:
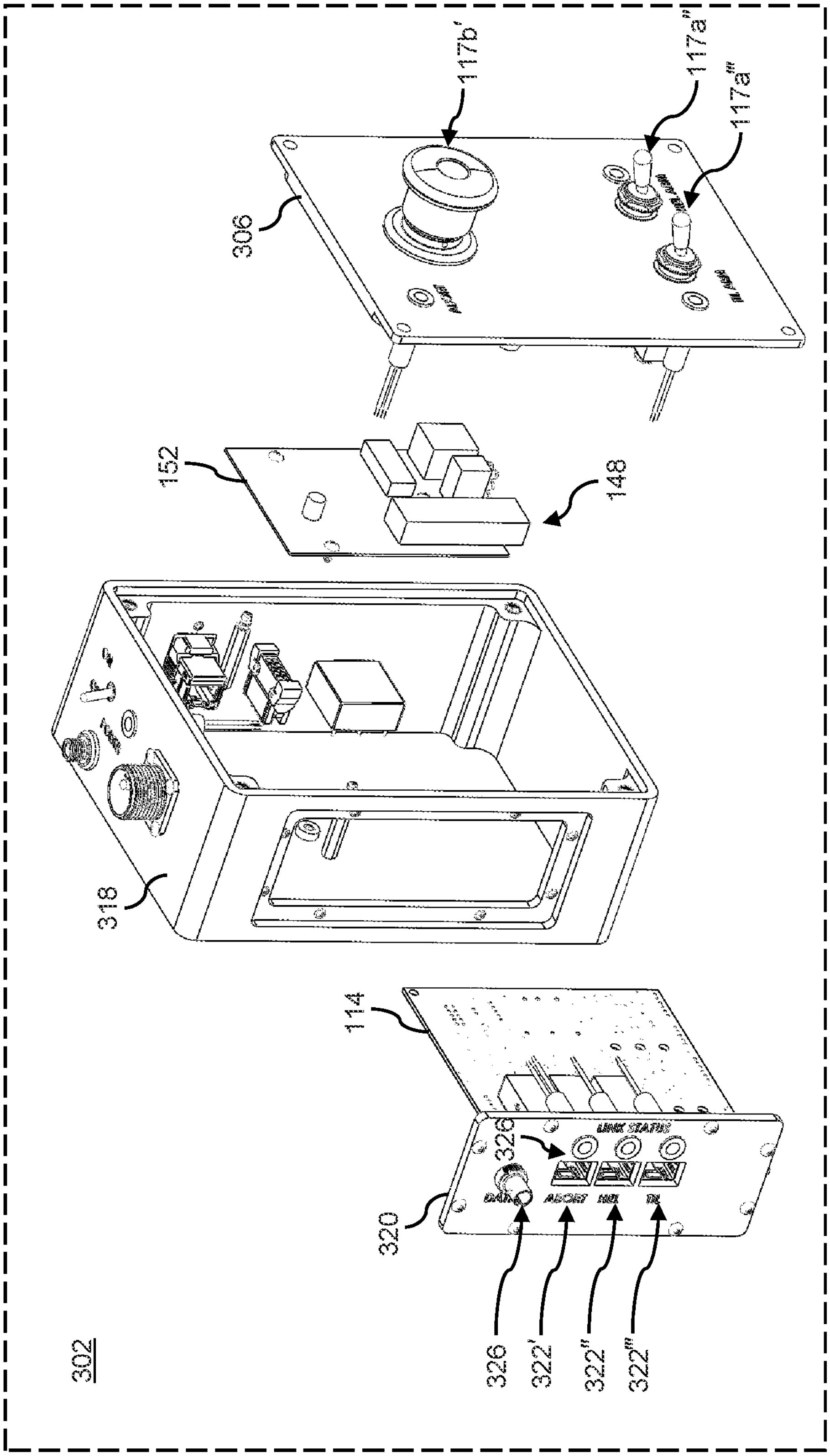
FIG. 6 shows a front left exploded view of the operator control panel.

Referring now also to FIGS. 5 and 6, the interior arrangement of the safety operator panel 302 is illustrated. The bidirectional SFP transceivers 132*a*, 132*b* and 132*c* corresponding to the optical fiber jacks 322', 322", and 322'" are shown operatively connected to the control circuitry 114. The bidirectional SFP transceivers 132*a*, 132*b* and 132*c* transmit the forward channels 109*a*, 109*b* and 109*c* for safety signaling and also receive the associated backhaul channels 126*a*, 126*b* and 126*c* for reporting QOS. Also illustrated is the network bidirectional SFP transceiver 148, which is operatively connected by lead 328 to the network optical network fiber jack 326 and operatively connected to the network transceiver control board 152. The network transceiver board 152 may be connected to the control circuitry 114 or may be a stand-alone control circuit. The network transceiver board 152 is operatively connected by lead 330 to the network output jack 154.

Although the preferred embodiment has been described in detail, it should be understood that various changes, substitutions and alterations can be made therein without departing from the spirit and scope of the invention as defined by the appended claims.

What is claimed is:

1. A safety signaling system comprising:

a first voltage to light converter (VTLC) disposed at an operator panel, the first VTLC configured to output a first light signal of a predetermined first light frequency only when receiving a predetermined first voltage indicative of a first operator safety condition set to a first value;

a first optical fiber operatively connected at a first end to the first VTLC to receive the first light signal outputted by the first VTLC and to propagate the first light signal to a second end;

a first light to voltage converter (LTVC) disposed at a remote interface, the first LTVC operatively connected to the second end of the first optical fiber to receive the first light signal, the first LTVC configured to output a predetermined second voltage only when receiving the first light signal; and remote interface control circuitry disposed at the remote interface, the remote interface control circuitry operatively connected to the first LTVC to receive the predetermined second voltage when output by the first LTVC and configured to set a first received safety condition to a first value when receiving the predetermined second voltage; and whereby the first light signal provides a first forward channel;

whereby the first received safety condition being set to the first value at the remote interface control circuitry is determinative that the first operator safety condition is currently set to the first value; and wherein the remote interface control circuitry uses the first received safety condition to determine a current value of a first remote safety condition.

2. The safety signaling system of claim 1, wherein the current value of the first remote safety condition is transmitted by the remote interface control circuitry to a remote system.

3. The safety signaling system of claim 1, wherein the first light signal is a continuous wave (CW) signal.

4. The safety signaling system of claim 3, wherein no software, no computers and no encoding are used to transmit the first voltage, the first light signal and the second voltage between the operator panel and the remote interface.

5. The safety signaling system of claim 1, wherein the remote interface control circuitry sets the current value of the first remote safety condition to the current value of the first received safety condition.

6. The safety signaling system of claim 1, wherein:

the remote interface control circuitry further comprises a failure latch subcircuit operatively attached to the first LTVC to monitor the second voltage;

wherein the failure latch subcircuit is configured to output a fault value to the remote interface control circuitry upon detecting an interruption of the predetermined second voltage;

wherein the remote interface control circuitry is further configured to set the current value of the first remote safety condition to a second value upon receiving the fault value from the failure latch subcircuit, regardless of the current value of the first received safety condition; and wherein the remote interface control circuitry is further configured to hold the current value of the first remote safety condition at the second value until the failure latch subcircuit is reset.

7. The safety signaling system of claim 1, further comprising:

a second VTLC disposed at the remote interface, the second VTLC configured to output a second light signal of a predetermined second light frequency, the second light frequency being different from the first light frequency, the second light signal transmitting a quality of service (QOS) attribute of the first forward channel;

wherein the first optical fiber is operatively connected at the second end to the second VTLC to receive the second light signal output by the second VTLC and to propagate the second light signal to the first end; and a second LTVC disposed at the operator panel, the second LTVC operatively connected to the first end of the first optical fiber to receive the second light signal, the second LTVC configured to output a QOS voltage indicative of the QOS attribute of the first forward channel; and whereby the second light signal provides a first backhaul channel.

8. The safety signaling system of claim 7, wherein:

the first VTLC and the second LTVC are provided by a first bidirectional modular transceiver disposed at the operator panel; and the second VTLC and the first LTVC are provided by a second bidirectional modular transceiver disposed at the remote interface.

9. The safety signaling system of claim 1, further comprising:

a third VTLC disposed at the operator panel, the third VTLC configured to output a third light signal of a predetermined third light frequency indicative of a network message;

a second optical fiber is operatively connected at a first end to the third VTLC to receive the third light signal outputted by the third VTLC and to propagate the third light signal to a second end;

a third LTVC is disposed at the remote interface, the third LTVC operatively connected to the second end of the second optical fiber to receive the third light signal, the third LTVC configured to output a third voltage indicative of the network message when receiving the third light signal;

a fourth VTLC is disposed at the remote interface, the fourth VTLC configured to output a fourth light signal of a predetermined fourth light frequency, the fourth light frequency being different from the third light frequency, the fourth light signal transmitting another network message;

wherein the second optical fiber is operatively connected at the second end to the fourth VTLC to receive the fourth light signal outputted by the fourth VTLC and to propagate the fourth light signal to the first end; and a fourth LTVC is disposed at the operator panel, the fourth LTVC is operatively connected to the first end of the second optical fiber to receive the fourth light signal, and the fourth LTVC is configured to output another network voltage indicative of the another network message; and whereby the third and fourth light signals together provide a bidirectional pair of network communication channels.

10. The safety signaling system of claim 9, wherein:

the third VTLC and the third LTVC are provided by a third bidirectional modular transceiver disposed at the operator panel; and the fourth VTLC and the fourth LTVC are provided by a fourth bidirectional modular transceiver disposed at the remote interface.

* * * * *